(12) United States Patent
Rayos (10) Patent No.: US 8,341,810 B2
(45) Date of Patent: Jan. 1, 2013

(54) FASTENING OR MOUNTING APPARATUS

(75) Inventor: Richard C. Rayos, Warren, MI (US)

(73) Assignee: RayoMar Enterprises, Inc., Sterling Heights, MI (US)

( * ) Notice: Subject to any disclaimer, the term of this patent is extended or adjusted under 35 U.S.C. 154(b) by 337 days.

(21) Appl. No.: 12/783,258

(22) Filed: May 19, 2010

(65) Prior Publication Data

US 2011/0078880 A1    Apr. 7, 2011

Related U.S. Application Data (60) Provisional application No. 61/248,561, filed on Oct. 5, 2009.

(51) Int. Cl.
*B60R 9/04* (2006.01)
*B60R 9/048* (2006.01)
*B60R 9/058* (2006.01)

(52) U.S. Cl. ........... 24/462; 24/460; 24/580.1; 224/326; 224/321

(58) Field of Classification Search .............. 24/460, 24/461, 462, 573.09, 580.1, 581.1; 224/309, 224/310, 315, 317, 321, 322; 439/716, 532; 403/286, 121, 532, 363, 375, 322.4, 350; 52/460, 465, 60, 242, 405.2, 436, 470
See application file for complete search history.

(56) References Cited

U.S. PATENT DOCUMENTS

| | | | |
|---|---|---|---|
| 3,325,067 A | 6/1967 | Helm | |
| 3,851,429 A * | 12/1974 | Zimmer | 52/94 |
| 4,099,658 A | 7/1978 | Bott | |
| 4,411,401 A | 10/1983 | Anderson | |
| 4,721,239 A | 1/1988 | Gibbs, III et al. | |
| 4,970,832 A * | 11/1990 | van Herpen | 52/60 |
| 5,042,553 A | 8/1991 | Schaffer et al. | |
| 5,114,367 A * | 5/1992 | Bolliger | 439/716 |
| 5,170,920 A | 12/1992 | Corrente et al. | |
| 5,192,227 A | 3/1993 | Bales | |
| 5,274,972 A * | 1/1994 | Hansen | 52/220.5 |
| 5,358,162 A | 10/1994 | Hill | |
| 5,598,959 A | 2/1997 | Lorensen et al. | |
| 5,602,363 A | 2/1997 | Von Arx | |
| 5,664,715 A | 9/1997 | Gogan et al. | |
| 5,810,618 A * | 9/1998 | Barbier et al. | 439/532 |
| 5,857,799 A * | 1/1999 | Blake, III | 403/292 |
| 5,904,592 A | 5/1999 | Baran et al. | |
| 5,907,476 A | 5/1999 | Davidsz | |
| 6,017,251 A | 1/2000 | Rittmann | |
| 6,234,371 B1 | 5/2001 | Sinn | |
| 6,431,909 B1 | 8/2002 | Nolden et al. | |
| 6,456,495 B1 | 9/2002 | Wieloch et al. | |

(Continued)

*Primary Examiner* — Robert J Sandy
*Assistant Examiner* — Rowland D Do
(74) *Attorney, Agent, or Firm* — Linda D. Kennedy; Butzel Long (57) ABSTRACT

A fastening or mounting apparatus for releasably joining two objects is disclosed. The apparatus has a first component and a second component. The first component may include a plate, two side walls and two flanges extending from the side walls. The second component may include a plate, a first lip and a second lip. The first lip has a cavity holding a resilient element. The second lip may have a convex portion and at least partially define a detent. One of the flanges engages with the resilient element in the cavity while the two components are non-parallel. The first flange compresses the resilient element while the second flange contacts the convex portion. The resilient element biases the second flange against the detent once the two components are parallel.

9 Claims, 7 Drawing Sheets

U.S. PATENT DOCUMENTS

| | | | |
|---|---|---|---|
| 6,543,957 B1 * | 4/2003 | Raspotnig | 403/286 |
| 6,546,598 B1 | 4/2003 | Nakanou et al. | |
| 6,748,716 B1 * | 6/2004 | Peck et al. | 52/718.04 |
| 7,073,971 B2 * | 7/2006 | Schurr et al. | 403/325 |
| 7,090,103 B2 | 8/2006 | Aftanas et al. | |
| 7,156,694 B1 * | 1/2007 | Anderson | 439/535 |
| 7,351,116 B2 * | 4/2008 | Dold | 439/716 |
| 7,758,368 B2 * | 7/2010 | Schelonka et al. | 439/325 |
| 7,918,064 B2 * | 4/2011 | Singleton | 52/464 |
| 7,922,521 B1 * | 4/2011 | Wu | 439/532 |
| 2005/0274757 A1 | 12/2005 | Arend | |
| 2010/0216334 A1 * | 8/2010 | Christmann et al. | 439/532 |

* cited by examiner

FASTENING OR MOUNTING APPARATUS

This application claims the benefit of U.S. Provisional Application No. 61/248,561, filed Oct. 5, 2009.

BACKGROUND

A common design trade-off in technology areas of fasteners and mounting systems is that devices capable of providing speed and efficiency in reversibly fastening two objects or mounting an object on a surface or other object sometimes lack holding power sufficient for heavy-duty applications. Conversely, fasteners and mounting systems that are robust in holding power sometimes lack convenience in fastening and mounting operations. Further, in some fastening and mounting technologies, each cycle of fastening and unfastening, or mounting and dismounting, degrades the performance of the fastener or mounting device. Several embodiments of the fastening or mounting apparatus aim to optimize these competing design considerations.

SUMMARY

In one embodiment, the fastening or mounting apparatus is an apparatus for releasably joining two objects, comprising a first component having first and second flanges and a second component having a first lip at least partially defining a channel, a resilient element disposed within the channel, and a second lip at least partially defining a detent, wherein the channel is adapted to receive the first flange in contact with the resilient element and the detent is adapted to receive the second flange.

In another embodiment, the fastening or mounting apparatus may further comprise a projection connected to the first lip wherein the projection is adapted to bias the second flange toward the detent.

In another embodiment, the fastening or mounting apparatus may further comprise the second flange and the detent having complimentary geometries.

In another embodiment, the fastening or mounting apparatus may further comprise a lock.

In some embodiments, the resilient element may be a polymer, and in some embodiments, the second component may have a recessed portion. Further, the second component may also have a resilient strip.

DETAILED DESCRIPTION

Figure 1:
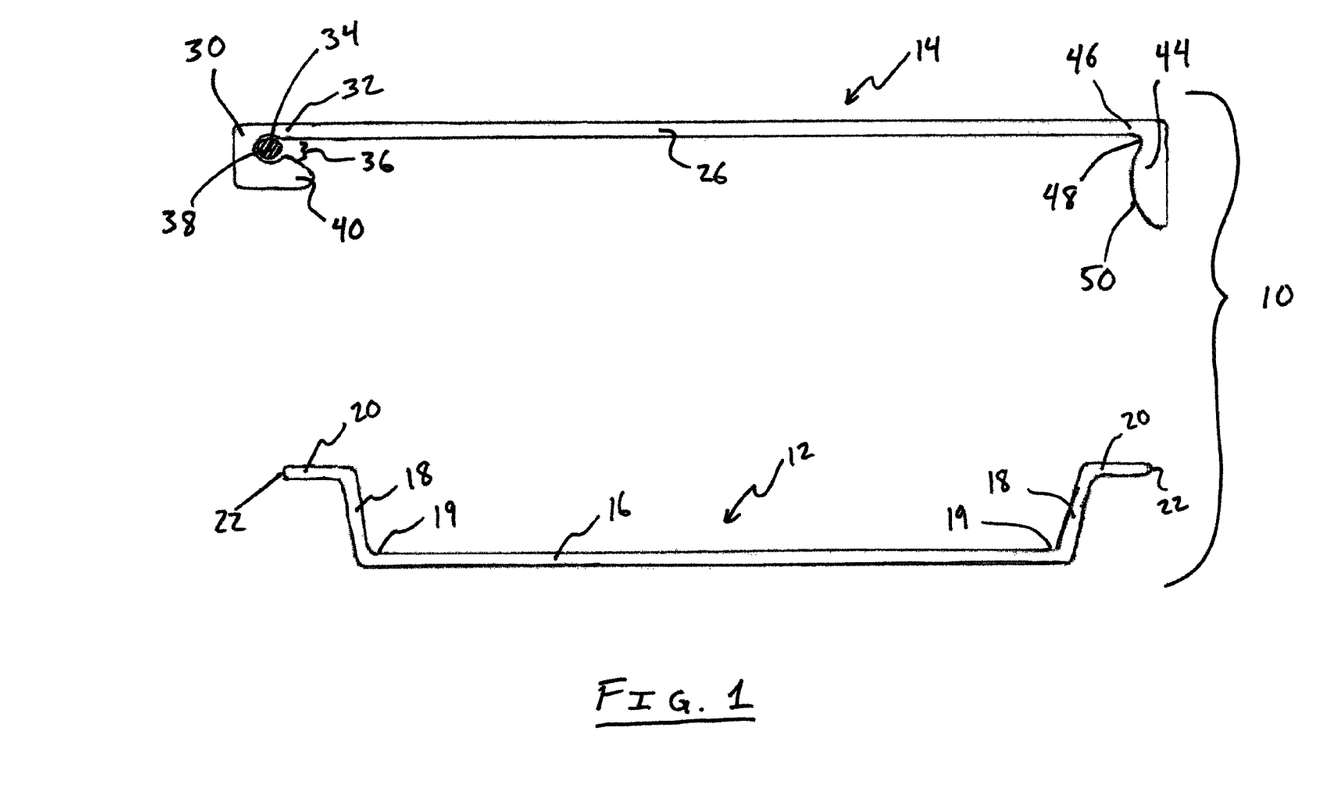
FIG. 1 is an exploded end view or cross-sectional view of an embodiment of the fastening or mounting apparatus.

FIG. 1 shows an exploded, cross-sectional or end view of an embodiment of the fastening or mounting apparatus 10. The apparatus 10 comprises a first component 12, an alternative embodiment of which is shown in a perspective view in FIG. 3, and a second component 14, an alternative embodiment of which is shown in a perspective view in FIG. 2.

Figure 3:
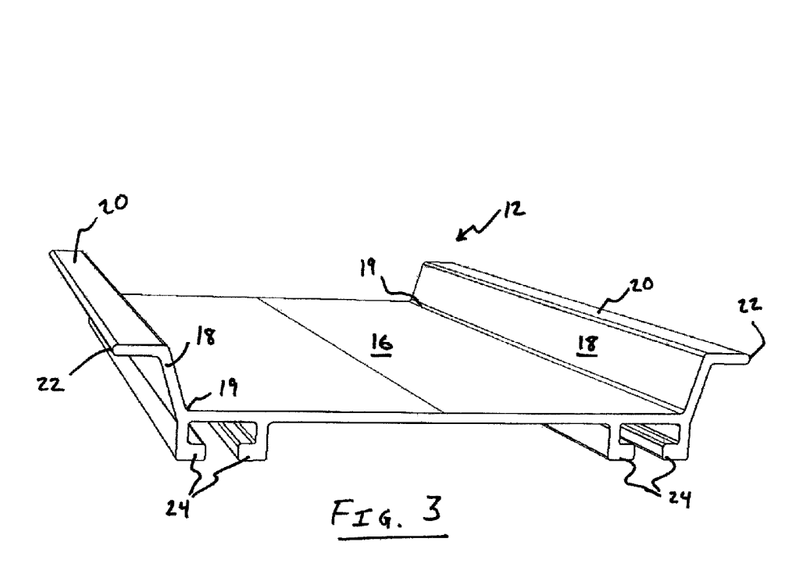
FIG. 3 is a perspective view of a component of the fastening or mounting apparatus.

With reference to FIGS. 1 and 3, the first component 12 of the apparatus 10 comprises a substantially rectangular and substantially planar plate 16. The plate 16 may be a single, solid piece of material or may be otherwise foamed with holes or spaces (not shown) throughout the plate to save material and weight. The first component 12 further comprises side walls 18 formed with or joined to the plate 16 along longitudinal edges 19. Each side wall 18 may form an angle with respect to the plate 16, which angle may vary in different embodiments. In some embodiments, the angle between the plane substantially formed by each side wall 18 and the plane formed by the plate 16 may be in a range of approximately 80 to 100 degrees. Each side wall 18 has a flange 20 formed with or joined to it. In some embodiments, each flange 20 may be substantially planar and lie in a plane substantially parallel to the plane in which plate 16 lies. In some embodiments, one or both of the flanges 20 further comprises a tip 22 having a substantially semicircular cross-sectional shape or other particular geometry.

Figure 6:
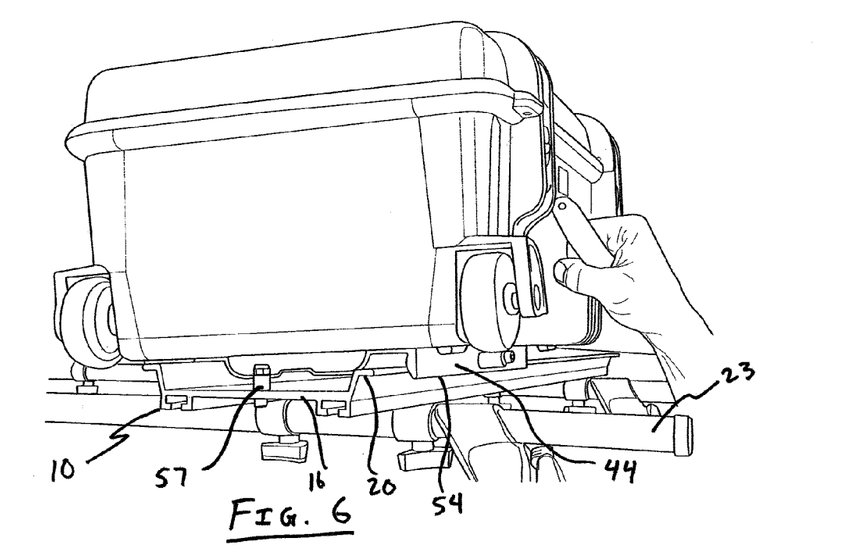
FIG. 6 is a perspective view of the fastening or mounting apparatus in operation.
Figure 7:
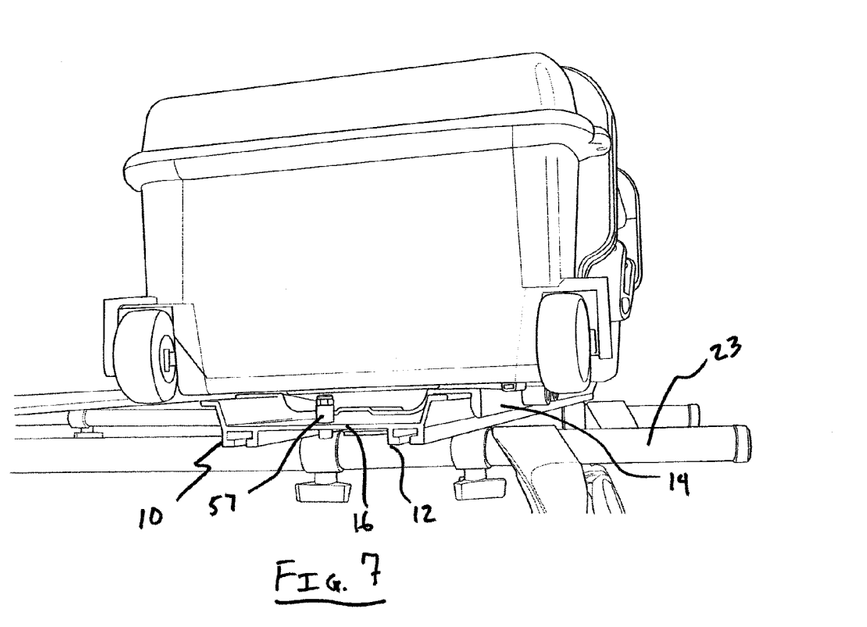
FIG. 7 is another perspective view of the fastening or mounting apparatus in operation.
Figure 8:
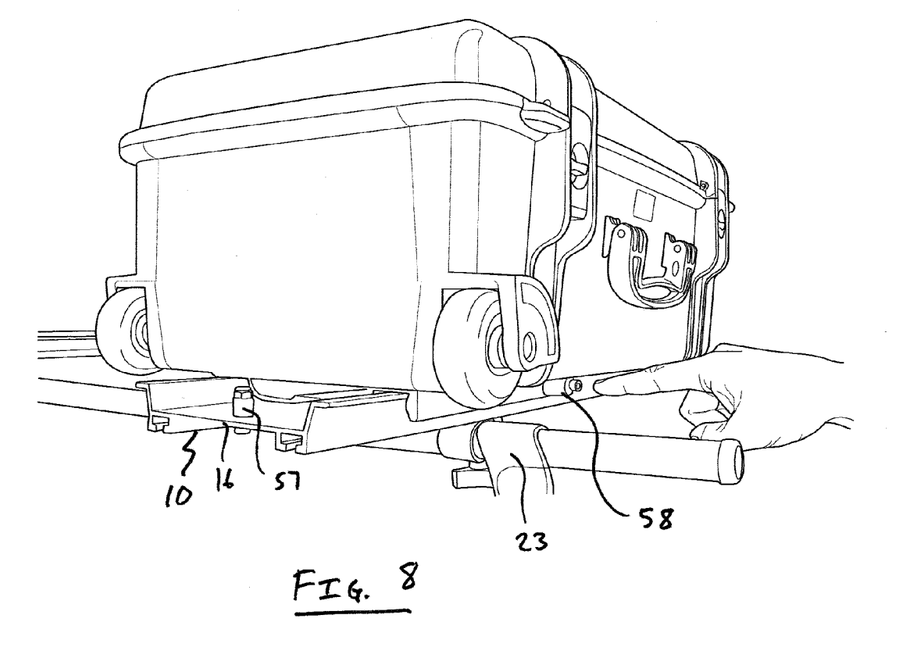
FIG. 8 is another perspective view of the fastening or mounting apparatus in operation.

The first component 12 of the apparatus 10 may be mounted on a fixed surface (not shown), on a vehicle (not shown), or attached to any object through any means. By way of example and not limitation, the first component 12 may be mounted to a rooftop rack 23 of a vehicle, such as a rack on an automobile, as shown in FIGS. 6-8. Holes (not shown) may be provided in the first component 12 to facilitate mounting of the first component, or in an alternative embodiment, the first component 12 may include rails 24 for mounting the first component 12 on a fixed surface or on a vehicle.

Figure 2:
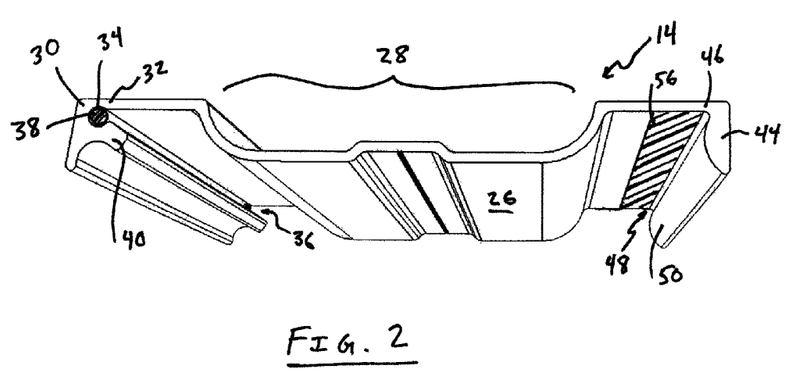
FIG. 2 is a perspective view of a component of the fastening or mounting apparatus.
Figure 4:
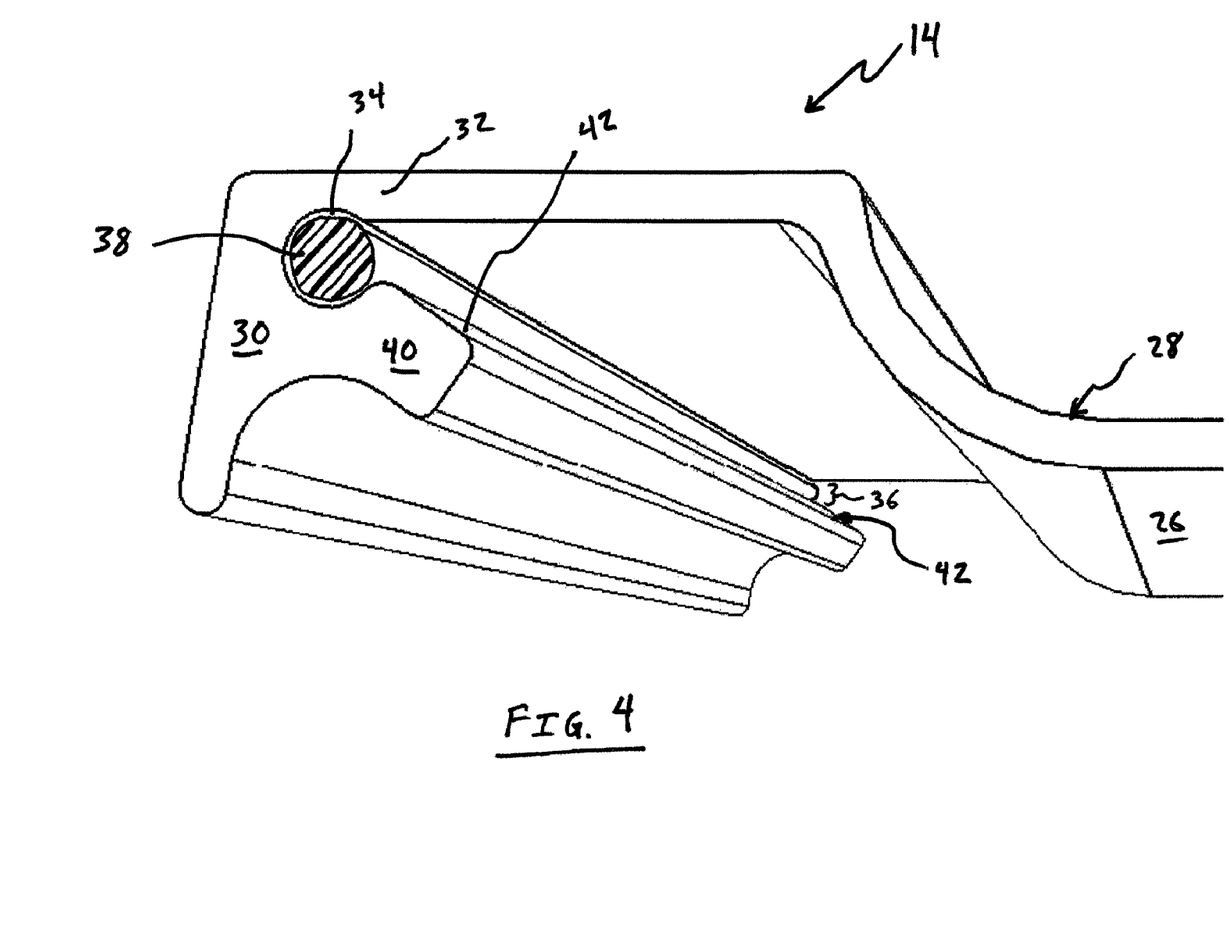
FIG. 4 is an enlarged perspective view of a portion of a component of the fastening or mounting apparatus.

With reference to FIGS. 1, 2, and 4, the second component 14 of the apparatus 10 comprises a substantially rectangular plate 26. The plate 26 may be substantially planar as shown in the embodiment illustrated in FIG. 1, or the plate 26 may have a recessed portion 28 as shown in the embodiment illustrated in FIG. 2. The plate 26 may be a single, solid piece of material or may be otherwise formed with holes or spaces (not shown) throughout the plate to save material and weight.

The second component 14 further comprises a first lip 30 formed with or joined to the plate 26 along longitudinal edge 32 of the plate 26. The first lip 30, either alone or in combination with the plate 26 and the longitudinal edge 32 of the plate 26, further defines a cavity 34 having an aperture 36. In some embodiments, the cavity 34 may have a substantially semi-circular cross-sectional shape as disclosed in FIGS. 1, 2, and 4. In other embodiments, the cavity 34 may have a different cross-sectional shape. The aperture 36 is sized to receive a flange 20 of the first component 12. In some embodiments, a resilient element 38 is disposed within the channel 34. The resilient element 38 may be any resilient material, including but not limited to any of various polymers or rubbers. Further, the resilient element 38 may be disposed throughout the entire length of the channel 34 or may comprise multiple portions (not shown) disposed intermittently or at intervals throughout the channel 34. In some embodiments, the first lip 30 may further comprise a projection 40 having a beveled surface 42, both of which may run the entire length of the first lip 30 or may comprise multiple portions or segments (not shown).

With reference to FIGS. 1 and 2, the second component 14 further comprises a second lip 44 formed with or joined to the plate 26 along longitudinal edge 46. The second lip 44, either alone or in combination with the plate 26 and the longitudinal edge 46 of the plate 26, defines a detent 48 and a convex portion 50. The detent 48 is sized to receive the tip 22 of one of the flanges 20. In some embodiments, the detent 48 may have a rounded shape having a substantially semicircular shape sized to mate with the shape of the tip 22 of one or both of the flanges 20 in order to maximize the surface area in contact between the tip 22 and the detent 48 when the first component 12 and second component 14 are joined. Alternatively, the detent 48 and tips 22 of the flanges 20 may have other shapes suitable for maximizing the frictional forces between them when they are in contact with each other, such as complimentarily shaped geometries that maximize the amount of surface area over which the detent 48 and tip 22 make contact.

The first component 12 and second component 14 may be formed or manufactured from any substantially rigid material, including, but not limited to, wood, metal, plastic, or other substantially rigid material. Further, components 12 and 14 may be manufactured through any of a variety of processes including but not limited to molding, stamping, forming, or extruding. In one exemplary embodiment, first and second components 12 and 14 are made from extruded, anodized aluminum. In another exemplary embodiment, first component 12 is made from formed sheet metal having a thickness in the range of approximately 10 to 16 gauge. In other embodiments, first and second components 12 and 14 may be made from other metals, including but not limited to magnesium, steel, or stainless steel. In embodiments constructed or formed from metal, the metal may be anodized. In some embodiments, it may be desirable to form, sand, machine, or otherwise make all exposed edges of both first and second components 12 and 14 dull or rounded in order to prevent injuries to users when handling or using the apparatus 10. By way of example and not limitation, in an embodiment wherein the first component 12 is made from sheet metal, tips 22 of flanges 20 may comprise a folded hem.

In operation, the first component 12 is fastened or attached to a fixed surface, the surface of a vehicle, or any object through any mounting means. By way of example and not limitation, the first component 12 may be mounted to a rooftop rack 23 of a vehicle, such as a rack on an automobile as shown in FIGS. 6-8. The second component 14 may be separately fastened or attached to another surface or object, such as, by way of example and not limitation, a trunk, suitcase, or other object. Holes 52 may be provided in the plate 26 of the second component 14 for fastening or attaching the second component 14 to the surface or object. In embodiments where the second component 14 is intended to be attached to cargo or luggage having a handle, external frame, or other external protrusion, embodiments of the second component 14 having a recessed portion 28 of the plate 26 to accommodate such external features may be used.

Figure 5:
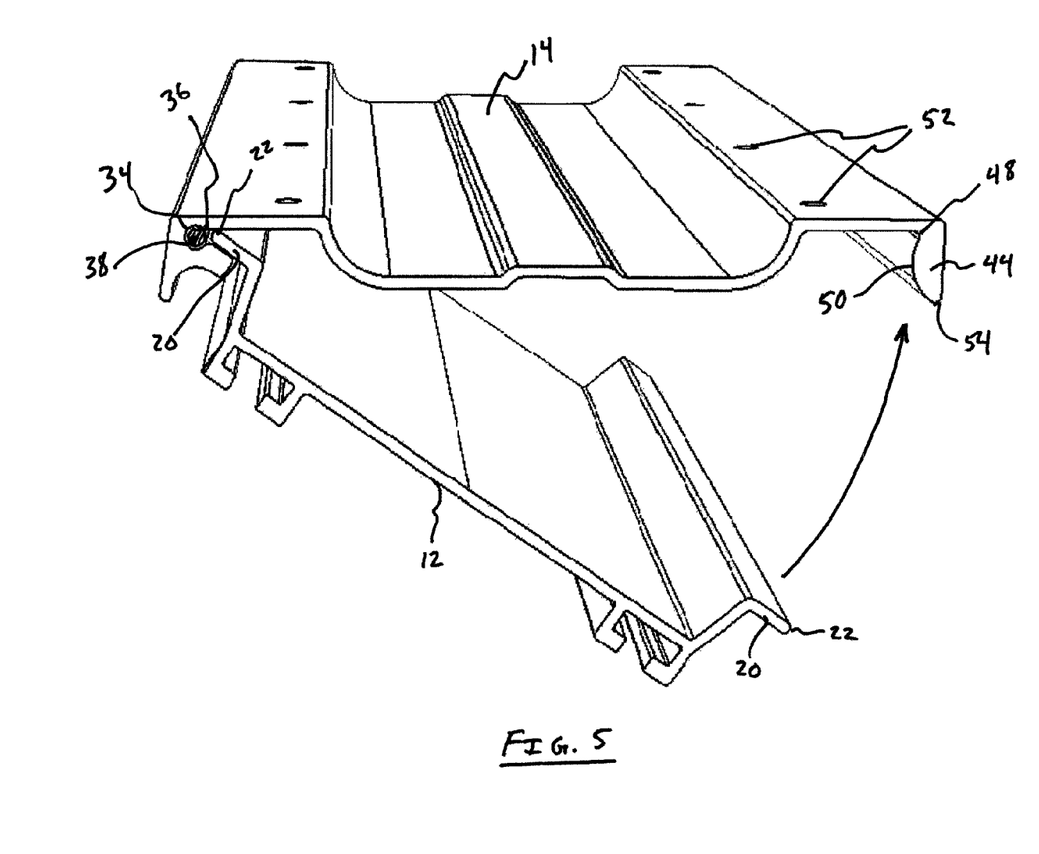
FIG. 5 is a perspective view of components of the fastening or mounting apparatus.

With reference to FIG. 5, first and second components 12 and 14 are joined or connected together by first inserting one flange 20 into the aperture 36 of cavity 34 at an angle sufficient for the other flange 20 not to interfere with the second lip 44. The flange 20 inserted into cavity 34 should contact the resilient element 38. The first and second components 12 and 14 are then rotated relative to each other around the points of contact between the flange 20 and the resilient element 38 so that the other flange 20 approaches the leading edge 54 of the second lip 44, as shown in FIG. 6. The first and second components 12 and 14 should be sized so that when these components come into contact in this way, sliding the rounded tip 22 of flange 20 along the convex portion 50 of the second lip 44 causes the opposite flange 20 to compress the resilient element 38 inside of the cavity 34. As the tip 22 of the flange 20 in contact with the convex portion 50 of the second lip 44 slips over the tangent point of the convex portion 50 of the second lip 44, a restoring force from the compressed resilient element 38 acting on the first component 12 will aid the tip 22 of the flange 20 in seating itself in the detent 48. Once the tip 22 has come to rest in the detent 48, the resilient element 38 may be in a slightly compressed condition such that the resilient element 38 is exerting a force on the first component 12 sufficient to maintain contact between the rounded tip 22 of the flange 20 and the detent 48. Further, the convex portion 50 creates an additional interference fit of the tip 22 of the flange 20 in the detent 48.

Once joined or connected together, the force exerted by the resilient element 38 on the first component and the geometry of the detent 48 and convex portion 50 of the second lip 44 should be sufficient to prevent the first and second components 12 and 14 from decoupling absent the application of specific forces or couples that are sufficient to both compress the resilient element 38 and rotate the first and second components 12 and 14 relative to each other such that the tip 22 of the flange 20 in the detent will ride over the convex portion 50 of the second lip 44 toward the leading edge 54 of the convex portion 50, thus allowing the opposite flange 20 to be removed from the cavity 34. This functionality may depend upon several variables, including, without limitation, (1) the distance between the tips 22 of the flanges 20 of the first component, (2) the distance between the detent 48 and the resilient element 38, (3) the geometry of the convex portion 50 of the second lip 44, and (4) the size, composition, and durometer of the resilient element 38. In some embodiments, the first and second components 12 and 14 are sized so that the tip 22 of one flange 20 is in substantially uniform contact with the resilient element 38 along the entire length of the apparatus 10 while the tip 22 of the other flange 20 is in substantially uniform contact with the detent 48 along the entire length of the apparatus 10 when the first and second components 12 and 14 are joined.

In some embodiments, depending upon the other variables discussed above, the distance from the tip 22 of one flange 20 to the tip 22 of the other flange 20 is approximately equal to the distance measured from the center of the cavity 34 to the inside tangent point of the convex portion 50 of the second lip 44. Alternatively, the tip-to-tip distance between the flanges 20 may be such that the resilient element 38 is slightly compressed such that it exerts a force on the first component 12 sufficient to maintain contact between the tip 22 of the flange 20 and the detent 48 when the tip 22 of one flange 20 is at rest in the detent 48. This force may be different in different embodiments depending upon the composition and hardness of the resilient element 38 as more fully described below.

In some embodiments, the resilient element 38 is a polymer strip, cord, or rod made from any polymer such as, by way of example and not limitation, polyurethane. In other embodiments, the resilient element 38 may be made from natural or synthetic rubber. In some embodiments, the resilient element 38 may be made from materials naturally resistant to or treated to be resistant to degradation caused by exposure to the elements, including but not limited to ultraviolet radiation, air, water, snow, ice, and extreme temperatures. The durometer of the resilient element 38 may be different in different embodiments depending in some embodiments upon the desired holding or frictional forces needed for the particular mounting application. In other embodiments, the durometer of the resilient element 38 may depend upon the desired ease or difficulty of joining and decoupling the first and second components 12 and 14. In general, the greater the durometer of the resilient element 38, the greater the force necessary to join or decouple the first and second components 12 and 14, but also the greater the frictional or holding forces keeping the first and second components 12 and 14 together when coupled. Depending upon the application for which the apparatus 10 is intended, the resilient element 38 may have a durometer in a range from approximately 20 to 90, although there may be applications in which durometers lower than 20 or higher than 90 may be used. In one exemplary embodiment, the resilient element 38 comprises silicone rubber and has a durometer in a range from approximately 40 to 55.

In some embodiments, a resilient strip 56 may be attached to the underside of plate 26 of the second component 14. In such embodiments, when the first and second components 12 and 14 are joined, the flange 20 nearest the detent 48 will be in contact with or even slightly compress the strip 56, increasing the frictional forces holding the first and second components together. This feature may be desirable in embodiments in which a lower durometer resilient element 38 is used in order to increase the relative ease of joining and decoupling the first and second components 12 and 14 while also maintaining holding forces sufficient to withstand the forces encountered in use. The strip 56 inhibits sliding of the components 12 and 14 relative to each other along the tips 22 of the flanges 20. The strip 56 may be made from any resilient material. In one exemplary embodiment, the strip 56 comprises silicone rubber.

With reference to FIGS. 6, 7, and 8, some embodiments of the apparatus 10 may further comprise a stop 57 attached to the first component 12 that further prevents the decoupling of the first and second components 12 and 14 that might occur through a relative sliding motion between the components. In these embodiments, the stop is attached to the plate 16 of the first component 12 and projects in a direction substantially normal to the plane of the plate 16 sufficiently in order to interfere with the plate 26 of the second component 14. In embodiments where the second component 14 may slide relative to the first component 12, the stop 57 interferes with the motion of the second component 14 in order to prevent decoupling of the first and second components 12 and 14 through relative sliding.

With reference to FIG. 7, once joined or connected as described above, the first and second components 12 and 14 are substantially resistant to separation under a wide variety of static and dynamic loads. In this configuration, the force exerted by the resilient element 38 on the first component and the geometry of the detent 48 and convex portion 50 of the second lip 44 is sufficient to prevent the first and second components 12 and 14 from decoupling absent the application of specific forces or couples that are sufficient to both compress the resilient element 38 and rotate the first and second components 12 and 14 relative to each other such that the tip 22 of the flange 20 in the detent will ride over the convex portion 50 of the second lip 44 toward the leading edge 54 of the convex portion 50, thus allowing the opposite flange 20 to be removed from the cavity 34. Further, in some embodiments, when coupled, sufficient compressive and frictional forces exist between the first and second components 12 and 14 such that the components are substantially resistant to any relative motion under static and dynamic loading conditions, admitting of substantially no sliding, lateral motion, or decoupling.

In some instances, one or both of first and second components 12 and 14 may become bent or deformed through accident or use such that the relative dimensions between the tips 22 of the flanges 20 of the first component 12 no longer provide a secure fit between the resilient element 38 and detent 48 of the second component 14. In such instances, the projection 40 and beveled surface 42 of some embodiments provide an alternative mechanism for inhibiting the separation or decoupling of the first and second components 12 and 14. Specifically, in such instances, in the presence of forces or force components acting substantially normal to the plane substantially defined by either of plates 16 or 26, the flange 20 may contact the beveled surface 42 of the projection 40. In these embodiments, the beveled surface 42 is angled relative to the plane substantially defined by either of plates 16 or 26 so that any reaction force occurring from any contact between the flange 20 and the beveled surface 42 generally acts to maintain contact between the opposite flange 20 and the detent 48. In one exemplary embodiment, the beveled surface 42 substantially resides in a plane that forms an angle of approximately 35 degrees with respect to the plane substantially defined by either of plates 16 or 26, however other angles may be used.

Figure 9:
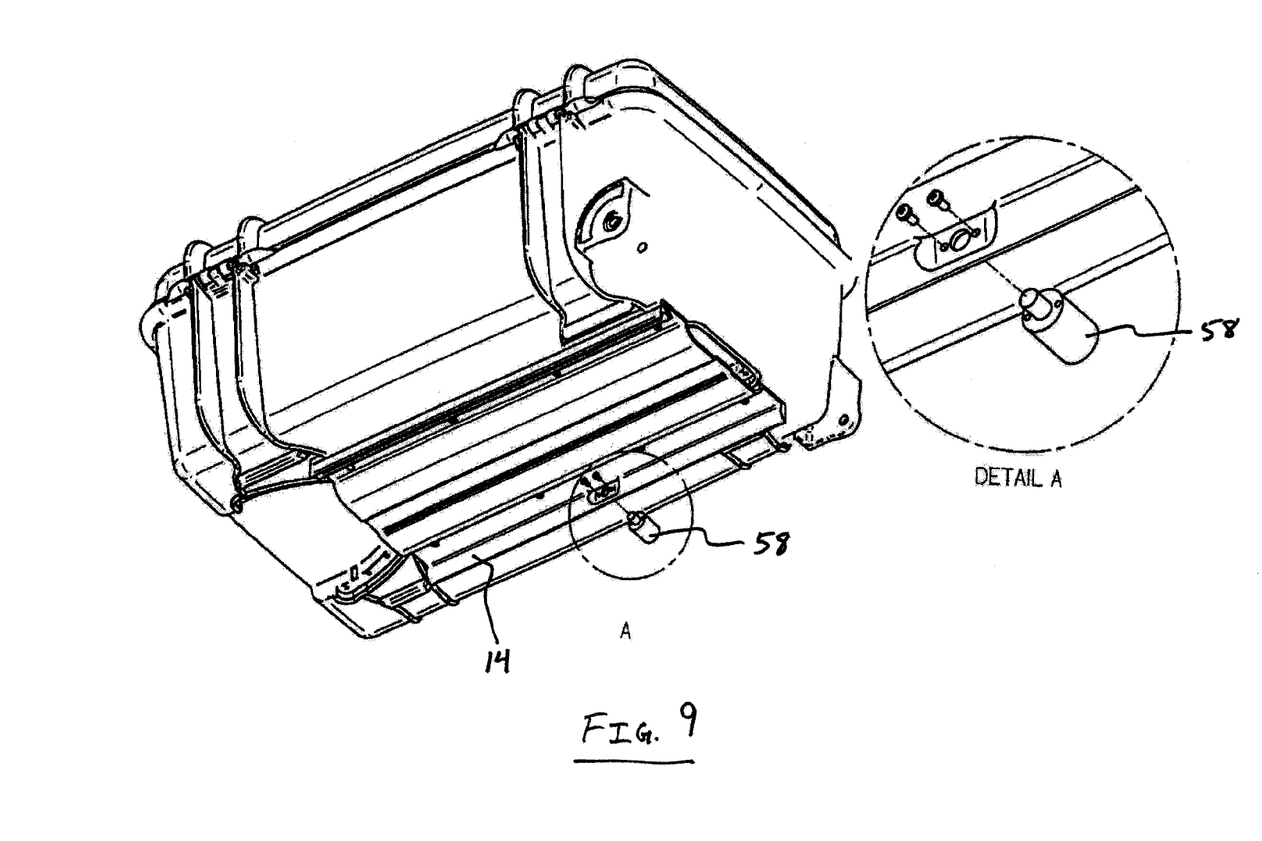
FIG. 9 is a perspective view of a component of the fastening or mounting apparatus showing in inset an enlarged detail.

In some embodiments of the apparatus 10, as shown for instance in FIGS. 8 and 9, a lock 58 may be used to temporarily secure the coupling of first and second components 12 and 14.

While the fastening or mounting apparatus 10 has been described in reference to some exemplary embodiments, these embodiments are not limiting and are not necessarily exclusive of each other, and it is contemplated that particular features of various embodiments may be omitted or combined for use with features of other embodiments while remaining within the scope of the invention. By way of example and not limitation, it may be useful in some instances to attach the second component 14 to a fixed surface or surface of a vehicle and attach the first component 12 to an object such as cargo or a piece of luggage. Further, the overall size and dimensions of the apparatus 10 may be different in different embodiments to suit particular installations or applications, or the apparatus 10 may be scaled up or down for use in applications not expressly disclosed or referenced herein.

The invention claimed is:

1. A fastener system, comprising:
   a first component including
      a first plate having a top side, a bottom side, and a first end opposite a second end;
      the first end having a first sidewall extending generally upwardly from the top side of the first plate, the first sidewall having a first flange extending outwardly from the first side wall;
      the second end having a second sidewall extending generally upwardly from the top side of the first plate, the second sidewall having a second flange extending outwardly from the second side wall; and
   a second component including
      a second plate having a top side, a bottom side, and a first end opposite a second end,
      the first end having a first lip extending downwardly from the bottom side of the second plate, the first lip at least partially defining a channel with a projection from the lip, the channel having a resilient member therein, the channel having an aperture along the length of the channel, the aperture facing a second lip on the second end, the second lip extending downwardly from the bottom side of the plate, the second lip having a detent portion and a portion that is shaped substantially semicircular and is convex relative to the first lip;

wherein the second component is removably attachable to the first component by a tip of the first flange being removably engageable with the resilient member and by a tip of the second flange being removably engageable with the detent.

2. The fastener system of claim 1 wherein the first component further comprises a mounting apparatus on the bottom side of the first plate.

3. The fastener system of claim 2 wherein the mounting apparatus comprises rails.

4. The fastener system of claim 3 wherein the rails are sized and shaped for attachment to a vehicle.

5. The fastener apparatus of claim 1 wherein the second flange has a tip that is substantially convex in shape relative to the second tip and the detent is substantially concave and complementary to the shape of the tip.

6. The fastener system of claim 1 wherein the bottom side of the second plate further comprises a resilient strip.

7. The fastener system of claim 1 wherein the first plate and the second plate comprise extruded aluminum.

8. The fastener system of claim 1 wherein the resilient member is a cord.

9. The fastener system of claim 8 wherein the cord is formed from a material selected from the group consisting of natural rubber, synthetic rubber and polyurethane.

* * * * *